United States Patent [19]
Henkin

[11] 3,743,088
[45] July 3, 1973

[54] DIAGNOSTIC DEVICE AND METHOD OF TREATMENT

[76] Inventor: Robert I. Henkin, 7705 Savannah Drive, Bethesda, Md. 20014

[22] Filed: Jan. 18, 1971

[21] Appl. No.: 107,279

[52] U.S. Cl. .................... 206/12, 23/259, 116/114, 206/45.19, 206/DIG. 29, 424/145
[51] Int. Cl. .... A45c 11/00, B65d 5/50, B65d 57/00, B65d 85/00
[58] Field of Search ................. 206/45.19, 12, 16 R, 206/1 R, DIG. 29, 72, 63.2 R; 220/20; 116/120, 114; 424/2, 10, 145; 23/259

[56] References Cited
UNITED STATES PATENTS
1,650,980 11/1927 Campbell ......................... 206/45.19
3,272,319 9/1966 Brewer ............................... 206/12
3,682,597 8/1972 Husch ............................. 206/45.19

*Primary Examiner*—William T. Dixson, Jr.
*Attorney*—LeBlanc & Shur

[57] ABSTRACT

A diagnostic device and method of utilizing the device to diagnose abnormal taste acuity in humans is presented. The device comprises a compact kit having a plurality of bottles with solutions therein useful to test patients according to a forced choice-three stimulus drop technique, two drops being water and the third an unknown stimulus, to determine taste detection and recognition acuity, a forced scale of subjective response to different concentrations of taste stimuli and to screen for genetic defects. Each bottle is numbered and arranged in a sequential array, labeled from normal to abnormal taste acuity through each of the four taste characteristics. The inside cover of the lid has a detailed key to the array containing the concentration and sequence for utilizing each container. The key and the array is visible, during testing, only to the person administering the test. A newly diagnosed disease, idiopathic hypogeusia is also described together with its symptoms and a method of treating the disease by administration of a therapeutic amount of zinc ion orally.

38 Claims, 5 Drawing Figures

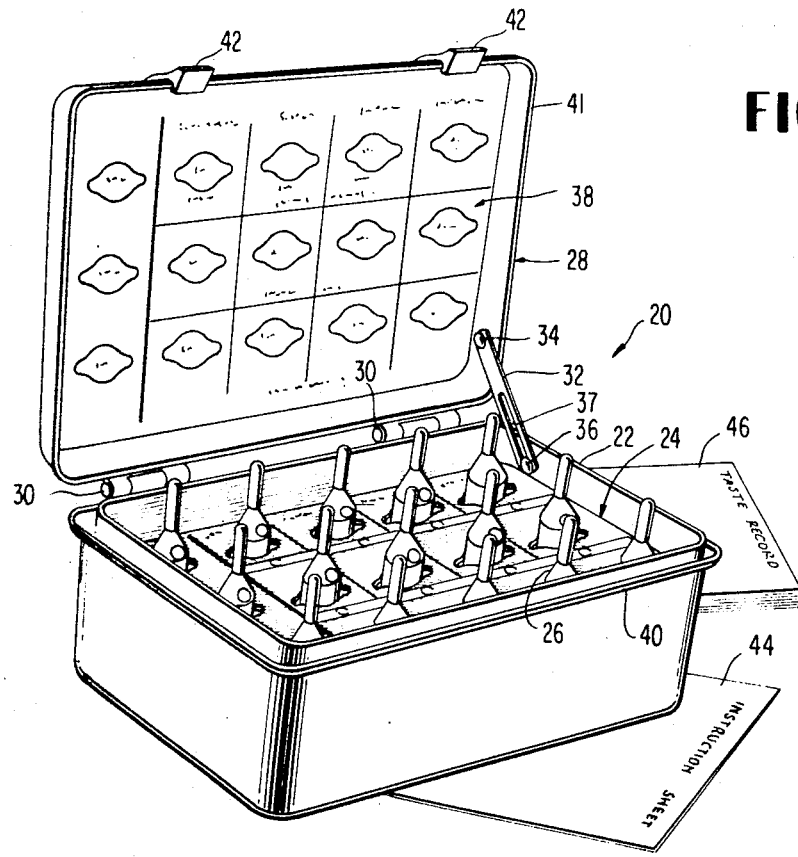
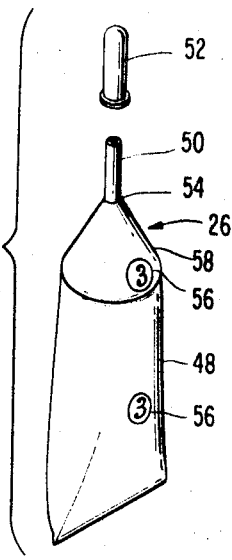
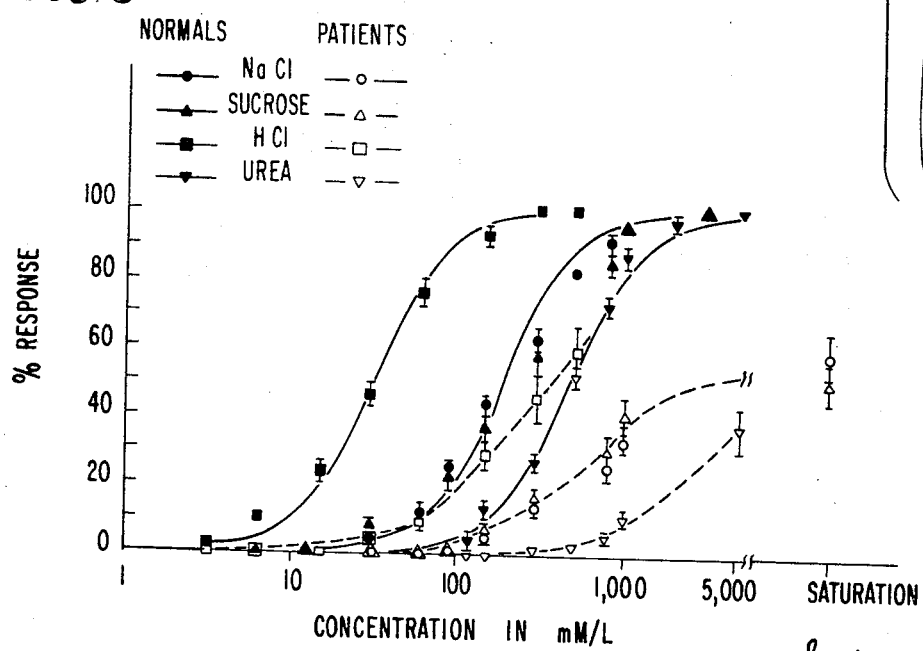
PATENTED JUL 3 1973
3,743,088
SHEET 1 OF 2
FIG. 1
FIG. 4
FIG. 5
NORMALS    PATIENTS
NaCl       —○—
SUCROSE    —△—
HCl        —□—
UREA       —▽—
% RESPONSE
CONCENTRATION IN mM/L
SATURATION
INVENTOR
ROBERT I. HENKIN
BY LeBlanc & Shur
ATTORNEYS

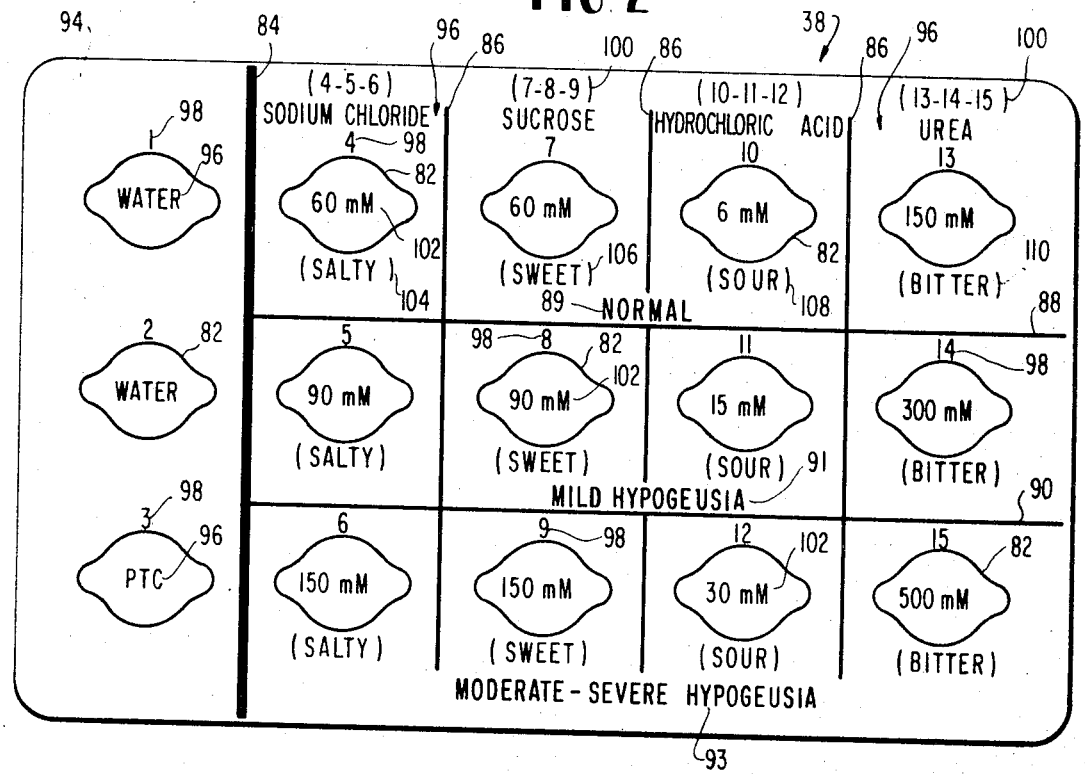
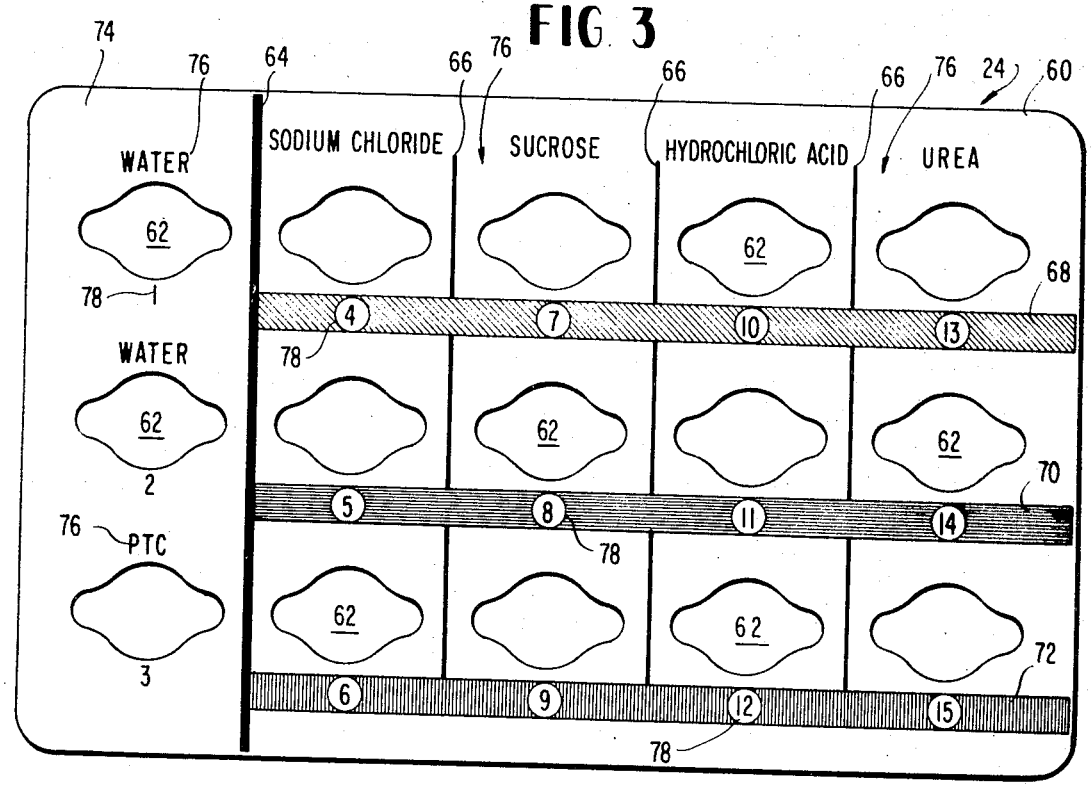

DIAGNOSTIC DEVICE AND METHOD OF TREATMENT

Changes in taste acuity accompany various disease processes. Although these changes are useful in diagnosis, the implications in medicine of abnormal taste sensitivity has been largely unexplored. As a diagnostic tool, the presence of an abnormal taste sensitivity in a patient may be indicative of a disease, a genetic disorder, or as will be subsequently explained, may be indicative of a newly discovered abnormality which primarily affects the sense organ of taste directly.

The eye and the ear have long provided useful information related to the diagnosis of various systemic diseases, but heretofore changes in taste have received little attention. Pathological processes which primarily affect the eye and the ear have prompted the development of specialties of ophthalmology and otology because of the needs of the many patients who suffer with problems related to these organs.

Pathological processes which primarily affect the sense of taste have remained heretofore undetected or, if detected, largely untreated. In addition, the association of abnormalities in taste sensitivity only indirectly related to genetic defects or pathological processes has only been partially explored as a diagnostic tool.

For example, as reported in the JOURNAL OF CLINICAL INVESTIGATION of 42, No. 5, pages 727–735 (1963), adrenal cortical insufficiency, panhypopituitarism, and cystic fibrosis of the pancreas have been observed to be accompanied by a more sensitive taste detection than that exhibited by normal persons. This article describes experiments designed to measure the taste sensitivity of both normal persons and those afflicted with the aforementioned conditions.

Certain diseases resulting from genetic abnormalties are also associated with a diminished sensitivity to taste. For example patients with type familial dysautonomia (Riley-Day syndrome) and type II familial dysautonomia exhibit decreased taste sensitivity.

Many patients treated with drugs, such as penicillamine also exhibit a decreased sensitivity to taste.

In other disease conditions patients exhibit normal sensitivity for some taste characteristics and abnormal sensitivity to others.

As reported in ANNALS OF INTERNAL MEDICINE 71, No. 4, pages 791–821 (October 1969), patients with chromatin-negative gonadal dysgenesis and pseudohypoparathyroidism symptomatically exhibit normal sensitivity for salt and sweet, but abnormally low sensitivity for sour and bitter. These conditions, however, are accompanied by anatomical and physiological abnormalities of the palate which may account for the abnormalities of sour and bitter taste.

Certain other diseases resulting from genetic abnormalities may be associated with a diminished sensitivity to the taste of sweet. This condition, clinically referred to as hypoglycogeusia or aglycogeusia is associated with the rare and difficult to diagnose Hand-Schuler-Christian's disease. Aglycogeusia is also associated with idiopathic congenital hypoparathyroidism. The bitter taste of phenylthiocarbamide (hereinafter referred to as PTC) is used as a screening test for the detection of athyreotic cretinism.

In addition to taste abnormalities indirectly related to or associated with pathological processes and genetic defects, it has recently been discovered that a large number of patients suffer with an abnormality which primarily affects the sense organ of taste directly. This abnormality is actually a new disease having an unknown etiology with no common symptoms other than the following abnormalities of taste and smell.

This disease is composed of four major symptoms: (1) decreased taste acuity (hypogeusia), (2) unpleasant, obnoxious and perverted appreciation of food and drink (dysgeusia), (3) decreased olfactory acuity (hyposmia), and (4) unpleasant, obnoxious and perverted appreciation of odors (dysosmia). Although hypogeusia was found in each patient, dysgeusia, hyposmia and dysosmia were not uniformly present. In addition, other symptoms occurred with variable frequency. These include persistant sensations of saltiness, sweetness, sourness, bitterness, or metallic taste in the oral area in the absence of food which could not be relieved; sensations of persistant foul odor in the nasopharynx, which also could not be relieved; vertigo, hearing loss, loss of libido, and unexplained hypertension.

Because the disease exhibiting the above symptoms has not been related to a pathological process or physical symptom other than those relating to taste physiology and taste pathology, the disease has been named idiopathic hypogeusia.

Idiopathic hypogeusia is debilitating and distressing to persons suffering from the disease. The lack of knowledge relating to taste physiology and pathology and, to the inability of physicians to diagnose and treat the disease disease restricts patient care.

In general, persons suffering from the disease initially contact their local physician after the appearance of these symptoms. The local physician usually advises the patients that the symptoms will disappear within a short time. When the symptoms do not disappear or diminish in intensity, the patients usually return to their physician and, after a general examination which often reveals no physical abnormalities, they are referred to an otorhinolaryngologist since the symptoms relate to this area of pathology. Examination of these patients by an ENT physician is also generally unrevealing or, if any pathology is found, it cannot be related to the severity of the symptoms. Not uncommonly, because of the magnitude of the symptoms, the patients are referred to a neurologist at which time an examination usually indicates hypogeusia or hyposmia, but often no central or peripheral neural lesion to account for these symptoms. The bizarre nature of the symptoms, their subjective intensity and the lack of a clinically obvious pathological lesion causes many of these patients to seek psychiatric help, which also does not ameliorate the symptoms or complaints. The persistance of these symptoms, particularly the dysgeusia and dysosmia, without relief or hope of relief, produces anorexia, weight loss (as much as 50 pounds), anxiety, and, in some, severe depression with thoughts of self-destruction.

At the onset of hypogeusia, patients change or severely restrict their diets. Dietary restrictions are particularly damaging when the patients suffer from chronic diseases, such as rheumatoid arthritis or various forms of malignancy, in which an adequate balanced intake in food is required for continued successful therapy. In addition, many patients exhibit decreased acuity for sodium chloride, and in order for them to obtain the desired taste quality of their food, they add enormous excesses of sodium chloride at the table or in cooking. Due to the association between salt intake and hypertension, this may result in hypertension, which, to a physician without an awareness of taste pathology, may be difficult to treat.

In similar manner a loss of olfactory acuity has been associated with loss of sexual function or loss of libido. Thus, the discovery of abnormal taste or smell acuity may be a useful etiological or diagnostic factor in several physiological and pathological states. It therefore is extremely important to provide physicians with a rapid method and device for measuring taste acuity for diagnostic use.

The device of this invention is intended to provide physicians with an easily utilized diagnostic tool whereby taste acuity may be readily measured and evaluated for use in diagnosis of diseases wherein abnormal taste acuity is symptomatic and for use in diagnosing idiopathic hypogeusia. Utilization of the device of this invention will enable a local physician to diagnose abnormal taste acuity and thereby more rapidly minimize the debilitating and distressing condition of the patient without the delay and uncertainty now associated with the lack of a clinically useful diagnostic tool. The local physician, by using the device of this invention, will be able to pinpoint the nature of his patient's distress without necessarily consulting with neurological or end specialists.

The diagnostic device of this invention is a compact kit for testing patients according to the forced choice-three stimulus drop technique. The technique consists of administering two drops of water and one drop of a solution having one of the four taste characteristics, salt, sweet, sour, or bitter. In the preferred embodiment the kit is comprised of an array of fifteen bottles marked and labeled in sequence, and removably displayed in a case. The inside surface of the lid has an operator's key to the array inscribed thereon. The kit may also include a detailed instruction sheet and scorecards.

The kit is intended to be placed in front of the patient so that when the lid is raised, the array of test solutions is hidden from the patient's view, while the sequential key is readily visible to the one adminstering the test.

The left-hand column of the array contains two bottles of water and one of PTC. From left to right across the array, four columns of test solutions are presented, one corresponding to each of four taste qualities. In each column, the concentration of the solution increases from top to bottom. One row of four solutions is identified as the normal acuity for each of the four taste characteristics. The concentrations of other rows may correspond to mild hypogeusia and moderate to severe hypogeusia. In this manner, a patient who can neither distinguish a difference between two drops of water and the most concentrated solution in a column, or is only able to recognize the taste of the highest concentration of one or more of the four solutions in a row, clearly presents an abnormally low taste acuity, and therefore exhibits severe hypogeusia.

Each bottle in the array contains sterile, pyrogen-free solutions of a solute in distilled water. A preferred embodiment utilizes a unique long-necked, plastic bottle to keep the solution therein sterile after exposure to the air.

The device of this invention may be utilized to ascertain the patient's detection acuity defined as the concentration wherein the patient can distinguish between a drop of one of the test solutions and two drops of water, and the recognition acuity defined as the concentration wherein the patient can identify the different solution appropriately as salt, sweet, sour, or bitter.

In addition, the device of this invention may be utilized to develop a subjective response from the patient wherein the patient evaluates the concentration of the solution on a scale of from 0 to 100, wherein 0 is the taste of water and 100 is the taste of the most concentrated solution of salt, sweet, sour or bitter, he can remember. This procedure is known as "forced scaling".

The device may also be utilized as a screen for genetic abnormalities, as aforementioned, by utilizing PTC or by verifying the ability to recognize a sweet taste.

It has additionally been discovered that idiopathic hypogeusia which may be diagnosed with the device of this invention is accompanied by ultrastructural changes in the cellular organization in the taste buds of the papillae. Although the disease itself is not life-threatening, the inability to distinguish spoiled from fresh food, or the inability to smell smoke or escaping gas, provides a hazardous basis for a normal life. The absence of objective physical signs has led physicians to overemphasize the psychiatric problems associated with the disease, but the similarity of subjective complaints, and histological changes in the taste bud, indicate that the disease in fact is a pathological rather than psychiatric condition. It has been discovered in tests performed on many patients that, although the mechanism for the treatment is not clear, oral administration of transition metal ions, and particularly zinc ions in the form of zinc sulfate, will alleviate the symptoms of idiopathic hypogeusia and improve the taste thresholds of those afflicted.

Accordingly, it is an object of this invention to provide a diagnostic device for rapidly and efficiently determining the presence of abnormal taste sensitivity.

It is another object to provide an inexpensive kit which may be utilized by skilled or semi-skilled personnel to determine the detection and recognition thresholds of taste acuity.

It is another object to provide a diagnostic device in easily packaged form including a plurality of solutions of varying concentrations of each of the four taste characteristics arranged in sequential order for testing humans according to the forced choice-three stimulus drop technique to evaluate taste acuity.

It is still another object to provide a diagnostic kit for evaluating, objectively, the detection and recognition acuity of a patient for each of four taste characteristics, and to screen for genetic abnormalities having symptomatic taste abnormalities.

It is still another object to provide an uncomplicated and inexpensive diagnostic kit which may be utilized by semi-skilled personnel to record a patient's detection and recognition thresholds of taste acuity, to screen for genetic abnormalities, objectively, and, in addition, to evaluate, subjectively, a patient's scale response to increasing concentrations of solutions.

It is yet another object to provide a method for diagnosing the disease, idiopathic hypogeusia, in patients by evaluating the detection and recognition thresholds of taste acuity, together with the patient's scale response, and by comparing these results with those of normal individuals.

It is yet another object to provide a method of diagnosing idiopathic hypogeusia by application of the forced choice-three stimulus drop technique wherein two drops of water and one drop of a solution corresponding to one of the four taste characteristics are successively administered to the patient until the taste acuity for each of the four basic taste characteristics is measured.

It is a further object to provide a method of treating idiopathic hypogeusia through the administration of a therapeutic amount of a material containing a transition metal ion.

It is a further object to provide a method of treating idiopathic hypogeusia by orally administering an effective amount of zinc ion, until the patient's taste sensitivity returns to normal.

These and other objects will become readily apparent with reference to the drawings and the following description, wherein:

FIG. 1 is a perspective view of a preferred embodiment of the diagnostic kit of this invention;

FIG. 2 is a front elevation of the key to the array of test solutions exhibited in the lid of the kit;

FIG. 3 is a front elevation of the interior of the kit with the test solution bottles removed;

FIG. 4 is an exploded view of a preferred bottle for a test solution; and

FIG. 5 is a graphic display of the mean forced scaling results for sodium chloride, sucrose, HCl, and urea as determined with 21 normal volunteers and 35 patients having untreated idiopathic hypogeusia.

With attention to the drawings, and particularly FIG. 1 thereof, the diagnostic kit of this invention 20 comprises a box 22 containing an array 24 of bottles 26. Box 22 is provided with a lid 28 attached thereto by hinges 30, and with a detent locking device 32 attached to lid 28 by a rivet 34 and to the box 22 by a second rivet 36. Rivet 36 rides in track 37 and is designed to act with member 32 to maintain the lid 28 in the open position shown in FIG. 1. To close lid 28, member 32 is merely displaced to allow rivet 36 to slide upwardly along track 37.

Lid 28 displays a key 38 to the array 24 of bottles 26 contained in box 22. Box 22 carries a peripheral lip 40 designed to receive the edge 41 of lid 28 when the kit is closed. Resilient hook members 42 are adapted to engage lip 40 when edge 41 is received therein to lock the kit in a closed position.

The kit 20 may also contain an instruction sheet 44 and a plurality of scorecards 46.

With attention to FIG. 4, each of the bottles 26 consists of a resilient tube 48 for containing the test liquid. The tube 48 terminates in an elongated neck 50 having a cap 52 adapted to receive neck 50 and seat on edge 54 to close the bottle 26. The elongated neck 50 is particularly adapted to maintain the sterile, pyrogen-free condition of the solution contained within the bottle 26. Bottle 26 is labeled with numbers 56 which correspond to the sequence in the diagnostic test at which the particular bottle is utilized. The sequence number 56 appears both on the upper inclined surface 58 of the bottle and on the tubular surface 48. The purpose of two numbers 56 is to minimize the chance that, with useage, the label will be worn away leaving the bottle 26 unlabeled.

With attention to FIG. 3, the array 24 in box 22 consists of a divider plate 60 having uniformly spaced bottle-receiving holes 62. Holes 62 are arranged in horizontal rows and vertical columns shown in FIG. 3, and as will be subsequently explained. The holes 62 in the columns to the right of divider line 64 contain bottles of test solution corresponding to the four basic taste characteristics. Vertical lines 66 separate each column of test solutions which contain different solutes. Horizontal bars 68, 70, and 72 separate rows of different solutions each row having a relatively equivalent increase in concentration from the preceding row. As shown in FIG. 3, lines 68, 70, and 72 may be color coded if desired.

The area 72 left of divider line 64 contains a column of holes 62 for receiving two bottles of water, and one of PTC. Each column to the right of divider line 64 is identified as to solute by the legend 76 disposed at the top thereof. The holes 62 in area 74 are identified by legends 76 inscribed above each hole. A numeral 78 is inscribed below each hole 62. Each numeral 78 corresponds to the sequence wherein the bottle disposed thereover is to be used in the diagnostic test. Numerals 78 on plate 60 correspond to numerals 56 on bottles 26.

With reference to FIG. 2, the key 38 to the array 24 in plate 60 is inscribed on the interior face of lid 28. Key 38 is designed to fully describe the concentration and solution in the corresponding bottles in array 24 together with their sequence of administration and their function in the diagnostic test. Outlines 82 corresponding to holes 62 and plate 60 are disposed in rows and columns corresponding to the rows and columns in plate 60. The heavy vertical divider line 84 corresponds to line 64 in FIG. 3. Each vertical column is separated by a lighter line 86 corresponding to the lines 66 in FIG. 3. Accordingly, each column to the right of line 84 indicates a different solute.

Rows of outlines 82 are divided by lines 88 and 90. Line 88 corresponds to band 68 in FIG. 3 and line 90 corresponds to band 70 in FIG. 3. However, key 38 roughly identifies the concentration of each row with indicia 89, 91, and 93 inscribed below each row. In other words, one whose recognition threshold detects the solutes in the row above line 88 has a normal taste acuity. One who does not recognize the solutes in the normal row but does recognize the solutes in the middle row above line 91 has a somewhat higher threshold, and a mild reduction of taste acuity. Finally, one who recognizes only the solutes of the bottom row above 93, or does not recognize any of the solutes in any of the rows, has a markedly abnormal taste acuity.

The outlines 82 in the area 94 to the left of line 84 corresponds to holes 62 in area 74 of FIG. 3. Indicia 96 displayed within the outline 82 in area 94 and at the head of each column to the right of line 84 describes the type of solution contained in the bottles disposed in the corresponding holes 62. Numerals 98 disposed above each outline 82, correspond to the numerals 78 disposed below each hole 62, a divider plate 60 and to the numerals 56 on each bottle.

At the top of each column to the right of divider line 84 the sequence numerals 100 are summarized for the sequence of administering the bottles in each column. OUtlines 82 to the right of divider line 84 contain indicia 102 expressing the concentration of the container disposed in the corresponding hole 62 in divider plate 60. The basic taste characteristic for each solute in each row is identified below outlines 82 as for example salty 104, sweet 106, sour 108, and bitter 110.

It will be recognized that the indicia 96 and 76 corresponding to the taste characteristics 104, 106, 108 and 110, are representative only of solutes which may be utilized. In addition, although only three rows of concentrations for each column are shown, it will be obvious to those skilled in the art that, if desired, the concentrations may be varied, or additional rows may be added to more accurately detect the patient's threshold or scale of response. The concentration 102 in the normal row above 89 corresponds to the established recognition threshold for normal persons. Likewise, the concentration 102 in middle row above 91 corresponds to thresholds of mild hypogeusia which may or may not be indicative of a pathological condition. However, the concentrations in lower row above 93, clearly indicate moderate to severe hypogeusia strongly indicative of a pathological condition. Three rows only are presented in the preferred embodiment in the interest of simplicity, and to enable the physician to make a rapid diagnosis. If an abnormality is indicated subsequent tests with more solutions can accurately establish the thresholds and scales, but for general office use the three rows presented are sufficient.

To utilize the device of FIG. 1, the patient is seated before the test administrator and the kit 20 placed between them. The kit is opened as shown in FIG. 1 with the key 38 facing the test administrator. In this manner lid 28 hides the key 38 and array 24 from the patient's view. After the test administrator has studied the instruction sheet and recorded the necessary patient identification data on the patient record 46, the diagnostic taste test is administered summarized as follows: each test solution is presented to the patient together with two solutions of distilled water. As shown on the sample record reproduced in Table 1 below, a drop of, for example water, is placed on the side of the anterior one third of the patient's tongue. A drop from a second water solution is then placed on the opposite side of the patient's tongue. Then a drop of sodium chloride from bottle 4 is placed on the patient's tongue. The patient's reaction to this sequence is recorded and the taste test diagnosis proceeds with higher concentrations of sodium chloride, and then with sucrose, HCl, urea, and finally with PTC.

Table I.
Patient Taste Record

| Name | Time | Sex | Age | |
|---|---|---|---|---|
| Date | NaCl (Salt) | Sucrose (Sweet) | HCl (Sour) | Urea (Bitter) |
| Normal (5–15%) | 1,4,2 % | 7,1,2 % | 2,1,10 % | 2,13,1 % |
| Mild Hypogeusia | 5,1,2 % | 2,8,1 % | 11,1,2 % | 1,2,14 % |
| Moderate-Severe Hypogeusia | 2,1,6 % | 1,2,9 % | 1,12,2 % | 15,2,1 % |
| PTC 100% Bitter | | | | 1,3,1 % |

The above sample patient record indicates a random method of presenting drops to the patient wherein a drop of the test solution is alternated with two drops of water. For example, as shown in Table 1 the first drop administered to the patient's tongue is water from bottle No. 1. The second drop is administered from bottle No. 4, and the third drop, being water, is administered from bottle No. 2. After three drops are administered to the patient's tongue the patient is asked whether he detects a difference, and if so whether he recognizes the taste as salt, sweet, sour or bitter. If the patient recognizes one of the solutions, the appropriate indicator on the score card is circled. The test then proceeds to the more concentrated solution in a bottle 5 and subsequently bottle 6. Then to bottles 7, 8, and 9; 10, 11, and 12; and so on until all bottles have been used.

If a scale response as shown in the graph of FIG. 5 is to be evaluated, after proper identification of the test solute as, for example, salty, the patient is asked to rate the concentration of the solution on a scale of 0 to 100. This subjective rating with normal persons will within reasonable tolerances fall on an S curve as pictured by the solid lines in FIG. 5, with a different parameter for sour and bitter and generally the same parameter for salt and sweet.

The following is a portion of a sample of the instructions 44 to accompany the kit 20.

CONTAINER DESCRIPTION

The tastants are arranged in rows and columns, numbered and divided into five categories: sodium chloride (NaCl) for salt taste (bottles 4–6), sucrose for sweet taste (bottles 7–9), hydrochloric acid (HCl) for sour taste (bottles 10–12), urea for bitter taste (bottles 13–15) and phenylthiocarbamide (PTC) for bitter taste (bottle 3). Water is in bottles 1 and 2. Each bottle is numbered on the shoulder and on the body.

TASTE RECORD DESCRIPTION:

On the patient taste record is a place for the name, age, and sex of the patient, the date and time at which the test was given and columns and rows for each tastant, similar to that within the container. There is also a column headed %. The sequence of numbers on the card within each row and column signifies the order you should present the taste solutions to the patient; e.g., 1 4 2 signifies that water, 60 mM NaCl, then water should be presented, in that order. Note: you will always use two drops of water and one drop of tastant in a sequence.

PROCEDURES

To perform the test the container is opened with its contents facing you, the top up. The patient sits opposite you, his view of your movements obstructed by the open top which serves as your screen. The scoring sheet should be in front of you. You will now present one drop from each of three solutions (two of water, one of tastant) on the tongue of the patient in the sequences noted on the taste record.

1. Begin with the first column, NaCl, and proceed down the column, in increasing concentration; i.e., bottle 4 (60 mM), bottle 5 (90 mM), bottle 6 (150 mM).

2. Continue the same procedure with the next column, sucrose, then the next, HCl and then the last, urea.

3. Place the drops of NaCl or sucrose on alternate sides of the anterior surface of the tongue; place the drops of HCl or urea on alternate sides of the middle or posterior surface of the tongue.

4. Do not allow the tip of any tube to touch the surface of the patient's tongue.

5. Do not proceed to the next taste quality until the residum of the last tastant has disappeared.

6. Remove the cap from the bottle used only prior to testing. Do not allow the patient to observe the number on the bottle.

7. It is not necessary to rinse the oral cavity with water between each trial. This only obscures the test results.

8. The patient may swallow any drop of tastant bottles (4–15) without harm since all are physiological solutions.

9. Always have the patient remove his upper denture prior to the start of the test.

10. If you are in doubt about the patient's ability to give a correct response you may wish to repeat the test at that concentration once or twice.

11. Always test the response to PTC last. The patient may wish expectorate this drop as he may find it extremely bitter.

DETERMINATION OF TASTE ACUITY

If the patient correctly identifies those tastants *above the blue line* (i.e., states they are different from water, and salty, sweet, sour and bitter, respectively) then his taste acuity is within normal limits. If the patient cannot identify the solutions above the blue line but identifies those *above the green line* he has mild hypogeusia. If he cannot identify those solutions above green line but only those above the red line or if he cannot identify these at all then he has moderate to severe hypogeusia.

ADDITIONAL INSTRUCTIONS

All solutions are packaged sterilely. Opening and closing them quickly, with care, will ensure their usefulness. If bacterial growth is noted in any solution the bottle should be discarded and a new bottle ordered. Similarly, if you contaminate any bottle by touching it to the patient's tongue, or by any other means, it should be discarded.

Unusual responses may occur. For example, the patient may exhibit normal taste acuity (above the blue line) but still complain of loss of taste. To assist in this respect another test may be performed with this kit. On the patient taste record there is in each row a column headed %. This column is used to record the subjective quantitative response of the patient to the tastant. For this test a drop of each tastant is put on the patient's tongue, in the order previously described, and the patient asked to state how salty, sweet, sour or bitter the drop is with respect to the saltiest, sweetest, sourest or bitterest solution he has ever tasted, judging that as 100 percent. Thus, the patient is asked to judge the intensity of the drop tasted by scaling it as a percentage of 100, the scale extending from 1 to 100. The percentages noted in the far left column of the patient taste record denote the normal range of intensity responses found for these concentrations of tastants.

DIAGNOSIS AND TREATMENT OF IDIOPATHIC HYPOGEUSIA

The symptoms of this disease, hypogeusia, dysgeusia, hyposmia, and dysosmia were originally studied in 35 patients. Of these patients, 21 were men and 14 women, age 34 to 68 (mean age 53 years). All of the patients experienced the symptom hypogeusia, but only a portion, as will be described, experienced the remaining three symptoms. Each patient, as stated above, was carefully evaluated, clinically and by laboratory test for any known cause of hypogeusia. This included a battery of laboratory tests and examinations designed to uncover any metabolic, otorhinolaryngological, neurological, or genetic lesion. These tests did not relate the hypogeusia to any previously described cause.

Eighteen (51%) had upper respiratory illnesses directly preceding or concommitant with the onset of their hypogeusia; seven had an influenza-like disease of at least 5 days' duration accompanied by chills and fever which occurred between 1968 and 1969, and was termed "Hong Kong flu" by their local physician. Two (6%) developed these symptoms following surgical procedures unrelated to the nose, mouth or throat; one following colectomy, the other following traumatic irrigation of the right external auditory canal. In 15 (43%) there was no specific correlative event. Twentysix (74%) reported a sudden onset of hypogeusia, the remainder, a gradual onset. Of the eighteen with a preceding upper respiratory infection all but one reported a sudden onset of hypogeusia, as did the two patients who developed the symptoms after surgical procedures.

Nine (26%) had a history of various minor allergic manifestations prior to the onset of their hypogeusia; e.g., to dust, various foods, penicillin or other drugs or hay fever. No patient knew of any relative with a history of hypogeusia or hyposmia. Seven (20%) experienced at least one episode of transient hypogeusia during a previous upper respiratory illness. Four of these seven experienced transient hypogeusia with at least 10 prior upper respiratory illnesses. Two who had experienced previous transient hypogeusia developed persistent hypogeusia gradually without an immediate preceding cause.

The mean duration of the hypogeusia at the time of their initial visit was 2.8 years (range, four months to 16 years). In general hypogeusia was persistent in nature although six reported variations in intensity without specific pattern.

Generally the symptoms occurred in the patients in one of three somewhat different ways. The following case histories are representative of each of the three groups.

Group 1

The patient was a 53 year old Caucasian male pizzamaker who was well until July 1969 when he experienced sudden onset of a severe upper respiratory infection associated with fever, chills and diaphoresis which lasted 6 days. During this time the patient noted a sudden loss of ability to taste and smell which persisted after recovery from the acute illness. On returning to work at his restaurant he noted profound, almost overpowering obnoxious odors associated with various foods and vapors. Any attempt to eat these foods was associated with an overbearing obnoxious taste. He described the taste and odor of food as rotten, as if it smelled and tasted like manure or decaying garbage. Foods which produced these symptoms included meats, eggs, fish, sharp cheeses, bread, coffee, tomatoes, onions, garlic and other spices. In addition to the odors of food, odors from soap, shaving lotion, dust, prespiration, frying grease, perfume, automobile exhaust and tobacco smoke were particularly obnoxious and nauseating. He also complained of a persistant sour-bitter-metallic taste in his mouth which never diminished in intensity and a rotten smell which similarly persisted in his nose. He limited his diet to lettuce, rice, bland processed cheeses and fresh apples. During this period he lost approximately 15 pounds of weight. Because of the magnitude of these symptoms he was forced to stop work at his restaurant.

Group 2

The patient was a 48 year old Caucasian male professional soldier who had no alterations in his taste or smell until 8 days following a colectomy of his right colon for an adenocarcinoma in November of 1969. His postoperative course was uneventful but when the patient resumed oral intake he noted that his first drink of water tasted so foul that he expectorated it immediately. Thereafter all food was associated with a foul, disgusting taste and smell, particularly pork and beans. All liquids were intolerable except "Hawaiian Punch". Sugar tasted repugnant and salt had an intensely metallic quality. Patient lost approximately 10 pounds of weight.

Group 3

The patient was a 67 year old Caucasian male building contractor who was well until 3 years prior to admission when he noted the gradual onset of loss of taste and smell with a progressive increase and sensations of obnoxious qualities of food and food odors, particularly meats, meat sauces, eggs, salad dressings, vinegar, tomatoes, onions, cheese, nuts, coffee, garlic, and any foods fried in fat. In addition the odors of soap and perfume were particularly obnoxious. This patient limited his diet to raw vegetables mainly carrots, cabbage and artichoke plants. He sustained a 30 pounds weight loss.

The most distressing symptom reported was dysgeusia. 22 of the 35 patients (63%) reported this symptom and characterized it as a rancid or spoiled taste in a wide variety of meats and vegetables. This symptom caused them to limit their diet to small amounts of bland cheeses, lettuce, and fresh fruits. This change in pattern of food intake was associated with a significant weight loss, and in some case it caused the patient afflicted to stop gainful employment and precipitated serious mental depression.

Patients reporting hypogeusia in absence of dysgeusia, generally described their food as tasteless, somewhat similar to chewing and swallowing flour paste or sawdust. These patients reported that in order to obtain the usually preferred salty or sweet taster in their food they added an excess amount of sugar or salt at the table. They also commonly ate unusual foods in an effort to find some food which had an agreeable, satisfying and tasty quality. This failed in all cases and was followed by the above described restrictions in dietary habits.

28 of the 35 patients (80%) reported decreased olfactory acuity in association of hypogeusia. The hyposmia was associated in each case with decreased ability to obtain flavor from foods, to detect the aroma of uncooked or cooked foods, or to distinguish fresh from spoiled foods. Some of the women with this symptom reported serving rancid food to their families due to their inability to recognize food spoilage. Several patients observed that they could not recognize the odor of escaping gas from kitchen appliances or heating devices. Women with this symptom reported increased frequency in the use of perfume, bath oil, and powder, while some reported similar behavior with after-shave lotion, cologne, and deodorants.

16 of the 35 patients (46%) reported dysosmia. These patients complained of a persistant obnoxious odor somewhat similar to gasoline, tar, dust or sweat. The smells of a wide variety of foods were particularly repugnant as were perfumes, toilet soaps, and detergents.

In order to catalog the magnitude of disability in taste and smell reported by these patients, objective and subjective tests were conducted as will be described.

OBJECTIVE MEASUREMENTS OF TASTE

Detection and recognition thresholds for representatives of each of the four taste qualities were measured in each patient by the forced choice-three stimulus drop technique. The detection threshold was the lowest concentration on solute which the patient could consistently distinguish as different from water for each taste quality. The recognition threshold was the lowest concentration of solute which the patient could consistently recognize as salt, bitter, sour, or sweet.

The technique utilized consisted of presenting a sequence of three drops of solution on the surface of the tongue; two of the drops were water, one of the drops contained a solute dissolved in water. The representative solutes chosen were sodium chloride for salt, sucrose for sweet, urea for bitter, and hydrochloric acid for sour. The concentrations of the solutions presented ranged from 6 mM/L to saturated for sodium chloride and sucrose, 90 to 5000 mM/L for urea and from 0.5 to 500 mM/L for HCl. It should be noted that these solutes chosen are merely representative of a variety of different solutes that could have been utilized.

Thresholds were determined in one taste quality before proceeding to the next. The patient was required to taste each drop within the oral cavity and to make two responses: one, which one of the three solutions presented was different in taste from the other two; and second, what was the characteristic taste of the dissimilar drop.

In addition, 21 normal volunteers, 10 men and 11 women, aged 21 to 60, were tested in a similar manner to determine their detection and recognition thresholds. Table II below summarizes the thresholds for the normal subjects, and for the patients afflicted with idiopathic hypogeusia.

TABLE II

Median Detection and Recognition Thresholds for Four Taste Qualities in 35 Patients with Idiopathic Hypogeusia

| Taste Quality | Patients MDT/MRT in mM/L | Range | Normal Subjects MDT/MRT in mM/l | Range |
|---|---|---|---|---|
| NaCl | 150/300 | 12–oo/30–oo | 12/30 tr | 6–60/6–60 |
| Sucrose | 90/150 | 12–00/12–00 | 12/30 | 6–60/6–60 |
| HCl | 30/60 | 3–>500/6–>500 | 12/30 | 6–60/6–60 |
| Urea | 800/800 | 300–>5000/300–>5000 | 3/6 | 0.5–61.8–6 |

MDT = median detection threshold
MRT = median recognition threshold
oo = inability to detect or recognize saturated solutions of NaCl or sucrose

SUBJECTIVE MEASUREMENT OF TASTE

In addition to threshold determinations, measurements of taste intensity over the entire range of taste acuity for each taste quality were made. For the forced sealing, as described above, each patient was required to specify the intensity of a single drop of a given concentration of solute on an absolute linear scale from 0 to 100 with 100 representing the most intense salty,- sweet, sour, or bitter taste previously experienced by the subject. Solutes were usually presented in ascending order from less concentrated to most concentrated. For the normal subjects these responses, when plotted as a percent response on the ordinate against concentration of solute presented on the abscissa, take the form of a single parameter curve which is generally similar for each taste quality, the major difference being the location of the response along the concentration axis. FIG. 5 presents the forced scaling curves for the normal patients and for the patients afflicted with idiopathic hypogeusia. It should be noted that the curves representing the patient's response have a substantially different slope and height than the curves representing normal responses.

OBJECTIVE MEASUREMENTS OF SMELL

Detection and recognition threshold for the vapors of pyridine in water and for nitrobenzene and thiophene in mineral oil were measured in each patient by a forced choice three stimulus sniff technique similar to that used for measurement of taste thresholds. To determine these thresholds each patient was required to sniff the vapor above a solution of pyridine in water with a single controlled sniff and to compare this with a sniff from the vapor above each of two solutions of water. The concentrations of pyridine in water presented ranged from $10^{-9}$ M/L to absolute. Similarly, the vapor above the solutions of nitrobenzene and thiophene in mineral oil ranged from concentrations of $10^{-9}$ M/L to absolute were compared with the vapors above the two solutions of mineral oil.

Most patients recognized the unpleasant character of pyridine at higher concentrations than did normal subjects. Patient described this sensation as similar to that of ammonia or infrequently like the more normal response of onion or garlic. For nitrobenzene most patients could recognize a sweet but unpleasant quality above the concentrated solutions while the normal subjects easily recognize the bitter almond or vanilla-like quality of the substance. For thiophene, most patients could only recognize an unpleasant, oily quality above solutions while normal patients easily recognize the burnt rubber, garlic-like or sulfurous quality of this substance. Detection and recognition thresholds for these vapors were determined in the same manner as those for taste. The results are presented in Table III below.

TABLE III

Median Detection and Recognition Thresholds for Three Vapors in 35 patients with Idiopathid Hypogeusia Compared to Normal Subjects

| Vapor | Patients MDT/MRT Range in M/L | |
|---|---|---|
| Pyridine | $10^{-1}/1$ | $10^{-3}$-oo/$10^{-1}$-oo |
| Nitrobenzene | A/A | $10^{-2}$-oo/ $10^{-1}$-oo |
| Thiophene | A/A | $10^{-2}$-oo/$10^{-1}$-oo |
| | Normal Subjects | |
| Pyridine | $10^{-7}/10^{-3}$ | $10^{-9}$-$10^{-5}$ |
| Nitrobenzene | $10^{-6}/10^{-3}$ | $10^{-7}$-$10^{-5}$/$10^{-5}$-$10^{-3}$ |
| Thiophene | $10^{-7}/10^{-3}$ | $10^{-8}$-$10^{-5}$/$10^{-4}$-$10^{-2}$ |

MDT = median detection threshold
MRT = median recognition threshold
A = ability to detect or recognize an absolute solution
oo = inability to detect or recognize an absolute solution In summary, median detection and recognition thresholds for the 35 patients were significantly elevated above normal. Their taste responsiveness for salt, sweet, and sour, extended over a wide range from inability to detect or recognize any solute to normal for some solutes. All patients had an abnormality in both detection and recognition of bitter.

Comparison of forced scaling for the patients with those of normal subjects indicates that the characteristic S-shaped curve obtained with normal subjects is markedly altered, that the responses of the patients were always shifted to a higher solute concentration, and that the responses of the patients generally did not reach 100 percent despite the presentation of saturated or very concentrated solutions.

In an effort to determine a physiological explanation for these symptoms, two to four circumvallate papillae were surgically removed in toto from eleven of the 35 patients for examination by light and electron microscopy.

No obviously identifiable changes from normal were observed by light microscopic examination of the circumvallate papillae. However, ultrastructural changes in the cellular organization were observed in the taste buds of the papillae of these patients compared to normal subjects upon examination by electron microscopy. There was a general lack of organization of the pore area with a loss of normal fine cellular projections, decreases in number and the normal stratification of neurosecretory granules and an absence of the normally appearing dense extracellular material. There was a generalized vesication and vacuolization of the cytoplasm of two cell types; cellular differentiation and organization was much less than in normal buds. In some cells, fibrillar material which normally appears near the nucleus disappeared and was replaced by clear, glassy areas. These changes, not observed by light microscopy, were seen in each patient whose taste buds were exaMined although sampling of buds was of necessity limited in extent. The specific meaning of these changes with reference to taste acuity is, as yet, uncertain.

Although previous studies have attempted with uncertain success to correlate several metals of the transition series with abnormalities of taste, it was discovered that when these patients were treated with oral preparations containing zinc ion, and zinc sulphate in particular, the symptoms of this disease were corrected and the taste thresholds returned to or toward the normal range.

Although the etiology of the illness is not clear, and the mechanism by which the taste bud, apparently the major site of pathology in this disease, is affected is not clear, the changes of taste acuity can be ascribed to an alteration in the non-specific portion of the pre neural events of taste. By utilizing the above described procedure and diagnostic device, these changes in taste acuity may be rapidly ascertained and measured by skilled or semi-skilled personnel, and the presence of a disease of taste diagnosed rapidly and efficiently, and treated according to the procedure of this invention as will be described.

The 35 patients with diagnosed idiopathic hypogeusia were studied under three conditions. There were observed untreated, then they were treated with a lactose placebo for from one to four weeks, and finally a group of eleven patients were hospitalized for treatment with zinc ion. The usual dosage was an equivalent of 25 milligrams zinc ion, administered, combined in a biologically and pharmacologically acceptable salt, 4 times a day, with food. Taste thresholds and forced scaling were measured during at least two separate occasions, and olfactory thresholds were measured at least once. Zinc in serum and urine was measured by atomic absorption spectrophotometry with an Instrumentation Laboratory IL 153 dual channel atomic absorbtion spectrophotometer.

Median detection and recognition acuity for the eleven patients treated with zinc ion are shown in Tables IV and V below both before and after treatment. Prior to treatment the acuity of these eleven patients was not significantly different from that of the total patient group. See Tables II and III above.

Treatment with placebo for one week to one month did not significantly alter acuity although subjective improvements in taste acuity did occur in some patients. During this period mean serum and urine levels of zinc did not differ from control values.

Treatment with zinc ion improved taste acuity in each patient both subjectively and objectively. No patient became worse on therapy. In six of the patients taste detection and recognition acuity returned to normal for each test quality while eight had thresholds which returned to normal for all qualities but bitter.

The effective dosage utilized varied from an equivalent of 25 to 150 milligrams zinc ion combined as a salt, per day. Any biologically and pharmacologically accepted salt, such as zinc acetate, zinc chloride, or zinc sulfate could be used, but the latter is preferred.

Subjective and objective improvement in taste acuity in most of the eleven patients occurred within two to four weeks after therapy was initiated; a few required as long as four months before improvement was noted. The first indication of an improvement was usually a diminition of the intensity of dysosmia and dysgeusia. This was followed by an increase in patient's appetite, a desire for foods previously rejected, and a significant increase in body weight.

The return to or toward normal taste acuity appears to be independent of sex, age and preceding events, but did appear related in some patients to the severity of the hypogeusia or ageusia at the time treatment was initiated.

Comparison of forced scaling measurements of intensity before and after zinc therapy in all eleven treated patients indicated significant alterations in these judgments toward the normal scale for each taste quality. The shape of the curves (not shown) after treatment TABLE IV(a).—MEDIUM DETECTION AND RECOGNITION ACUITY FOR 4 TASTE QUALITIES AND TOTAL CONCENTRATION OF ZINC IN SERUM AND URINE OF 11 PATIENTS WITH IDIOPATHIC HYPOGEUSIA BEFORE THERAPY WITH ZINC SULFATE

| | | | Pre-treatment | | | | | |
|---|---|---|---|---|---|---|---|---|
| Sex | Age | Preceding event | NaCl, mM./l. | Sucrose, mM./l. | HCl, mM./l. | Urea, mM./l. | Serum, Zn, µg./100 ml. | Urine, Zn µg./24 hr. |
| Patient: | | | | | | | | |
| A......M | 58 | None | 800/800 | 300/300 | 150/150 | 5,000/5,000 | 63 | 284 |
| B......F | 51 | URI | 90/90 | 30/30 | 15/500 | 800/800 | 87 | 270 |
| C......M | 53 | URI | 800/S | 150/50 | 60/500 | 1,000/1,000 | 78 | 632 |
| D......M | 51 | URI | 150/150 | 30/30 | 30/60 | 800/800 | 87 | 610 |
| E......M | 55 | URI | 150/150 | 30/30 | 15/30 | 800/800 | 90 | 748 |
| F......M | 64 | None | 300/1,000 | 300/300 | 30/>500 | 800/5,000 | 73 | 448 |
| G......M | 46 | ...do | 150/150 | 150/150 | 30/60 | 800/1,000 | 92 | 810 |
| H......M | 59 | URI | 150/150 | 30/30 | 30/30 | 300/1,000 | 76 | 580 |
| I......M | 60 | None | ∞/∞ | ∞/∞ | >500/>500 | >5,000/>5,000 | 92 | 453 |
| J......M | 68 | ...do | ∞/∞ | ∞/∞ | >500/>500 | >5,000/>5,000 | 76 | 752 |
| K......F | 60 | ...do | 90/300 | 30/30 | 15/>500 | 500/500 | 91 | 843 |
| Median | | | 150/300 | 150/150 | 30/500 | 800/1,000 | | |
| Normal values | | | 12/30 | 12/30 | 3/6 | 120/150 | | |

TABLE V(a).—MEDIUM DETECTION AND RECOGNITION ACUITY FOR 4 TASTE QUALITIES AND TOTAL CONCENTRATION OF ZINC IN SERUM AND URINE OF 11 PATIENTS WITH IDIOPATHIC HYPOGEUSIA AFTER THERAPY WITH ZINC SULFATE

| | | | Pre-treatment | | | | | | |
|---|---|---|---|---|---|---|---|---|---|
| Sex | Age | Preceding event | NaCl, mM./l. | Sucrose, mM./l. | HCl, mM./l. | Urea, mM./l. | Serum, Zn, µg./100 ml. | Urine, Zn, µg./24 hrs. | Duration in months |
| Patient: | | | | | | | | | |
| A......M | 58 | None | 60/60 | 12/12 | 60/60 | 500/500 | 91 | 970 | 11 |
| B......F | 51 | URI | 30/30 | 30/30 | 3/3 | 150/300 | 173 | 1,820 | 1 |
| C......M | 53 | URI | 12/12 | 12/60 | 6/6 | 120/120 | 112 | 1,056 | 4 |
| D......M | 51 | URI | 60/60 | 12/12 | 0.8/6 | 120/120 | 168 | 1,479 | 3 |
| E......M | 55 | URI | 30/30 | 12/12 | 3/6 | 90/90 | 118 | 2,144 | ½ |
| F......M | 64 | None | 300/500 | 90/90 | 6/60 | 500/500 | 125 | 1,444 | 2 |
| G......M | 46 | ...do | 30/60 | 30/30 | 6/15 | 90/90 | 105 | 2,646 | ½ |
| H......M | 59 | URI | 30/30 | 12/12 | 3/3 | 90/90 | 72 | 1,240 | ¼ |
| I......M | 60 | None | 3,000/3,000 | 150/150 | 60/60 | 2,000/5,000 | 165 | 1,802 | 1 |
| J......M | 68 | ...do | S/∞ | 300/300 | 150/>500 | 5,000/5,000 | 89 | 1,540 | 2 |
| K......F | 60 | ...do | 12/30 | 30/30 | 6/6 | 150/150 | 140 | 2,541 | ½ |
| Median | | | 30/60 | 30/30 | 6/6 | 150/150 | | | |
| Normal values | | | | | | | | | | a. Numerator of Fraction = Detection threshold
Denominator of Fraction = Recognition threshold
S = Saturated Solution (Sodium Chloride or Sucrose)
∞ = Inability to Detect or Recognize Saturated Solution
URI = Upper Respiratory Infection was more similar to those of normal volunteers, shown in FIG. 5, and each patient's curve was shifted to lower concentrations by a similar amount along the abscissa.

Ultrastructural changes in the cellular organization in the taste buds of the circumvallate papillae of these patients were partially reversed. The patients treated with zinc exhibited an increase in cellular organization and differentiation in all parts of the taste bud toward a more normal appearance.

As shown in Table V, after treatment with zinc ion, urinary levels of zinc rose significantly above control values in each patient while serum levels of zinc rose significantly in ten of the eleven patients. These latter increases occurred usually within the first few days following treatment. The pre-treatment levels of zinc in Table IV are values obtained during the untreated or placebo treatment conditions.

Administration of zinc with food was rarely associated with gastrointestinal upset. One patient who took the metal without food did report occasional heartburn. No toxic effects of administration of this metal were noted in any patient, the longest treatment period being approximately one year. No significant changes in any measured hematological parameter occured during treatment.

After treatment with zinc sulfate had produced significant subjective and objective improvements in taste acuity this treatment was replaced in some patients with the placebo. Treatment with the placebo resulted in a gradual return of hypogeusia and dysguesia previously experienced in each patient receiving this treatment. The time course over which the hypogeusia and dygeusia recurred varied and was associated with significant decreases in serum in urinary zinc.

Each of the eleven patients exhibited decreases in olfactory acuity prior to treatment with zinc. Treatment was usually associated with a diminition of subjective dysosmia, but concommittant improvement in olfactory acuity did not uniformly occur. Replacement of zinc with placebo was associated with a gradual return of dysosmia in those in whom this symptom improved on therapy.

The etiology of this illness is not known and its relationship to zinc metabolism is similarly unclear. It must be emphasized that initial serum and urinary zinc levels in these patients generally did not differ from normal, although treatment with zinc ion proved efficacious, and improvement was usually associated with an increase in both serum and urinary zinc. These values do not always reflect tissue concentrations of this metal.

Regardless of the general pathological etiology, the taste bud itself is the major site of damage in this disease. This damage is manifested by an alteration in the nonspecific portion of the preneural events of taste.

Treatment with zinc ion however has been shown to alleviate many of the most disturbing symptoms of this disease, and particularly, dysgeusia. Following treatment, the pathological changes in the taste bud appear less severe. However, the mechanism by which zinc alleviates these symptoms or changes taste bud histology is not known.

Many aspects of zinc administration in humans are not yet well studied, and the length of time during which zinc may be safely administered and the most effective dose for the therapy is not completely known. However, it has been proven that an oral dosage equivalent to between approximately 25 and 150 milligrams zinc ion, daily, will alleviate the symptoms of this disease, and no signs of toxicity have been observed in patients treated for up to one year.

In summary, a hitherto undiagnosed and unreported disease has been discovered, which disease may prove to affect a substantial number of persons. Although the etiology of the disease is not now known, it has been discovered that the most disturbing symptoms of the disease may be alleviated by treatment with zinc ion. Although the range of dosages of the zinc ion in the form of a zinc salt, such as zinc sulfate, have not now been completely explored, an oral dosage level of approximately 25 milligrams zinc ion, four times daily, is preferred to alleviate hypogeusia in most patients.

Due to a probable association of the disease with upper respiratory infections and with "flu-like syndromes", it may be speculated that a large number of persons may be afflicted with idiopathic hypogeusia in various degrees of intensity.

Because, before this invention, the diagnostic device hereinabove described, was not known, physicians were unaware of and unable to diagnose any disease that primarily affects the sense of taste, and many persons having this disease may reasonably be expected to have sought medical aid without success. By utilizing the device of this invention, a local physician, or a medical technician, may now screen and test patients rapidly and at little expense to discover taste abnormalities. In this manner, a disease of taste may be rapidly diagnosed, and treatment, according to the method of this invention may begin immediately.

As described above, the prior procedure employed to diagnose and treat persons having idiopathic hypogeusia included a lengthy series of neurological, otorhinolaryngological, and psychiatric examinations to discover a physiological or psychiatric explanation for the symptoms. During examination of these specialists, the patient is forced to endure the distressing and debilitating symptoms for a lengthy period of time without hope of relief. Even after undergoing these tests, diagnosis was unsure, and treatment unknown.

In contrast, by administering a forced choice-three stimulus drop taste test, utilizing the device of this invention, the objective manifestations of a disease of taste may be immediately recognized. In addition, following diagnosis, the symptoms may be rapidly alleviated by the method of treatment of this invention through administration of therapeutic amounts of zinc ion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A diagnostic device for diagnosing abnormal taste acuity comprising:

a container having a base, sides extending upwardly therefrom, and a lid hingedly attached thereto;

display means disposed within said container adapted to display an array of solutions for measuring taste acuity, at least a portion of said array grouping said solutions by solute and by concentration of solute;

indicator means carried by said display means for indicating a first portion of said array adapted to display a plurality of solutions having concentrations distinguishable at the normal taste sensitivity threshold, and for indicating a second portion of said array adapted to display a plurality of solutions having concentrations different from those in the first portion, distinguishable at an abnormal taste sensitivity threshold.

2. The device of claim 1 wherein the display means comprises a plate having a plurality of apertures therein each of said apertures adapted to receive a solution-containing bottle, said apertures being arrayed in mutually spaced columns and rows.

3. The device of claim 2 wherein the container is a rectangular box and said plate is mounted within said box in a plane parallel to and spaced above the base thereof.

4. The device of claim 2 wherein said plate contains a plurality of apertures arrayed in at least four columns, and said indicator means includes column indicia indicating that each column is adapted to display only bottles of solutions containing a common solute.

5. The device of claim 4 wherein the column indicia indicates that each of the said columns is adapted to display solutions having a taste characteristic different from each other column.

6. The device of claim 5 wherein the column indicia indicates that a first column displays solutions having a salty taste, a second column displays solutions having a sweet taste, a third column displays solutions having a sour taste, and a fourth column displays solutions having a bitter taste.

7. The device of claim 5 wherein the column indicia indicates that a first column displays solutions of sodium chloride; a second column displays solutions of sucrose; a third column displays solutions of hydrochloric acid; and a fourth column displays solutions of urea.

8. The device of claim 2 wherein said plate contains apertures arrayed in a plurality of rows, and said indicator means includes row indicia adjacent at least one of said rows indicating that the apertures in the said row are adapted to display only bottles of solutions having concentrations detectable at about the normal taste sensitivity threshold.

9. The device of claim 8 wherein said indicator means further comprises row indicia adjacent at least one of said rows indicating that the apertures in the said row are adapted to display only bottles of solutions having concentrations greater than the concentrations detectable at the normal threshold of taste sensitivity, thereby corresponding to an abnormally high threshold of taste sensitivity.

10. The device of claim 2 wherein said plate contains a plurality of apertures arrayed in at least four mutually spaced columns and a plurality of mutually spaced rows and said indicator means includes column indicia indicating that each of four of said columns of apertures is adapted to display bottles containing solutions corresponding to one of the four taste characteristics.

11. The device of claim 10 wherein the apertures in said plate are arrayed in at least three mutually spaced rows and said indicator means includes row indicia indicating that a first row is adapted to display only bottles of solutions having concentrations detectable at the normal threshold of taste sensitivity; a second row is adapted to display only bottles of solutions having concentrations detectable at an abnormally high threshold of taste sensitivity; and a third row is adapted to display only bottles having concentrations intermediate those in the first and second rows.

12. The device of claim 2 wherein said plate further contains at least one additional aperture and said indicator means includes indicia indicating said aperture is adapted to display only a bottle containing water.

13. The device of claim 12 wherein two additional apertures are provided and said indicator means includes indicia indicating each of said additional apertures is adapted to display only a bottle containing water.

14. The device of claim 2 wherein said plate contains a further aperture and said indicator means includes indicia indicating said further aperture is adapted to display only a bottle containing phenylthiocarbamide.

15. A diagnostic device for measuring taste acuity and for comparing the measured acuity with normal values comprising;
a box having a base and upwardly extending sides;
a lid hingedly attached at an edge thereof to the upper portion of a side of said box;
first and second releaseable locking means carried by said box and by said lid for locking said lid in an open and in a closed position relative to said box;
a divider plate mounted in said box, spaced above the base of said box in a plane parallel thereto, said plate having a plurality of bottle-receiving apertures, said apertures being uniformly arranged in mutually spaced columns and rows and adapted to receive bottles containing test solutions;
a first set of indicia on the upper surface of said plate, said indicia consisting of a sequence of numbers, each number being disposed adjacent an aperture;
a second set of indicia on the upper surface of said plate, said indicia indicating the contents of the bottles adapted to be received in said apertures;
a third set of indicia on the upper surface of said plate, said indicia indicating the level of taste acuity associated with detection of each of the solutions in the said bottles when the said bottles are received in the apertures.

16. The device of claim 2 further comprising a plurality of bottles, each of said bottles having a generally tubular base terminating in an elongated neck received in a cap, each of said bottles received in an aperture in said plate.

17. The device of claim 16 wherein a first portion of said bottles contains a salt solution, a second portion contains a sweet solution; a third portion contains a sour solution; and a fourth portion contains a bitter solution.

18. The device of claim 17 wherein the salt Solution contained in the first portion of bottles is a solution of sodium chloride in water.

19. The device of claim 18 wherein a bottle in said first portion of bottles contains a solution of sodium chloride in water having a concentration of about 60mM/L.

20. The device of claim 18 wherein a bottle in said first portion of bottles contains a solution of sodium chloride in water having a concentration of about 90mM/L.

21. The device of claim 18 wherein a bottle in said first portion of bottles contains a solution of sodium chloride in water having a concentration of about 150mM/L.

22. The device of claim 17 wherein the sweet solution contained in said second portion of bottles is a solution of sucrose in water.

23. The device of claim 22 wherein a bottle in said second portion of bottles contains a solution of sucrose in water having a concentration of about 60mM/L.

24. The device of claim 22 wherein a bottle in said second portion of bottles contains a solution of sucrose in water having a concentration of about 90mM/L.

25. The device of claim 22 wherein a bottle in said second portion of bottles contains a solution of sucrose in water having a concentration of about 150mM/L.

26. The device of claim 17 wherein the sour solution contained in said third portion of bottles is a solution of HC1 in water.

27. The device of claim 26 wherein a bottle in said third portion of bottles contains a solution of HC1 in water having a concentration of about 6mM/L.

28. The device of claim 26 wherein a bottle in said third portion of bottles contains a solution of HC1 in water having a concentration of about 15mM/L.

29. The device of claim 26 wherein a bottle in said third portion of bottles contains a solution of HC1 in water having a concentration of about 30 mM/L.

30. The device of claim 17 wherein the bitter solution contained in said fourth portion of bottles is a solution of urea in water.

31. The device of claim 30 wherein a bottle in said fourth portion of bottles contains a solution of urea in water having a concentration of about 150mM/L.

32. The device of claim 30 wherein a bottle in said fourth portion of bottles contains a solution of urea in water having a concentration of about 300mM/L.

33. The device of claim 30 wherein a bottle in said fourth portion of bottles contains a solution of urea in water having a concentration of about 500mM/L.

34. The device of claim 16 wherein at least one of said bottles received in an aperture in said plate contains water.

35. The device of claim 34 wherein two of the said bottles received in apertures in said plate contain water.

36. The device of claim 16 wherein at least one of said bottles received in an aperture in said plate contains phenylthiocarbamide.

37. The device of claim 2 wherein a key to the bottles adapted to be received in said array is mounted on the inside surface of the said lid, said key including indicia identifying the solute and concentration thereof of each solution in each of the bottles when said bottles are displayed in said array.

38. The device of claim 37 wherein said key further includes indicia identifying those solutions in the bottles when the bottles are displayed in the array having concentrations detectable at the normal threshold of taste sensitivity, and those having concentrations detectable at abnormally high thresholds of taste sensitivity.

* * * * *